(12) United States Patent
Mitobe et al.

(10) Patent No.: US 12,025,844 B2
(45) Date of Patent: Jul. 2, 2024

(54) CABLE, CABLE MANUFACTURING METHOD, AND PROTECTIVE MEMBER REMOVAL METHOD

(71) Applicant: Fujikura Ltd., Tokyo (JP)

(72) Inventors: Ryoichi Mitobe, Sakura (JP); Shuhei Kanno, Sakura (JP)

(73) Assignee: Fujikura Ltd., Tokyo (JP)

( * ) Notice: Subject to any disclaimer, the term of this patent is extended or adjusted under 35 U.S.C. 154(b) by 209 days.

(21) Appl. No.: 17/791,433

(22) PCT Filed: Mar. 4, 2021

(86) PCT No.: PCT/JP2021/008430
§ 371 (c)(1),
(2) Date: Jul. 7, 2022

(87) PCT Pub. No.: WO2021/118229
PCT Pub. Date: Sep. 16, 2021

(65) Prior Publication Data
US 2023/0042803 A1    Feb. 9, 2023

(30) Foreign Application Priority Data

Mar. 10, 2020 (JP) ................................. 2020-040735

(51) Int. Cl.
*G02B 6/44* (2006.01)
(52) U.S. Cl.
CPC ........... *G02B 6/4431* (2023.05); *G02B 6/443* (2013.01)
(58) Field of Classification Search
CPC .... G02B 6/4438; G02B 6/4432; G02B 6/443; G02B 6/4431
See application file for complete search history.

(56) References Cited

U.S. PATENT DOCUMENTS

| | | | | |
|---|---|---|---|---|
| 2002/0122640 A1* | 9/2002 | Strong | ................ | G02B 6/4411 385/114 |
| 2013/0016948 A1* | 1/2013 | Smith | ................ | G02B 6/4465 385/100 |
| 2022/0206236 A1* | 6/2022 | Gemme | ................ | G02B 6/441 |

FOREIGN PATENT DOCUMENTS

| | | |
|---|---|---|
| CN | 205959670 U | 2/2017 |
| JP | H01-194808 A | 8/1989 |
| JP | H11185534 A | 7/1999 |
| JP | 2002333561 A | 11/2002 |
| JP | 2005-150009 A | 6/2005 |
| JP | 2007212769 A | 8/2007 |

(Continued)

OTHER PUBLICATIONS

International Search Report issued in corresponding International Application No. PCT/JP2021/008430, mailed on May 25, 2021 (2 pages).

*Primary Examiner* — Sung H Pak
(74) *Attorney, Agent, or Firm* — Osha Bergman Watanabe & Burton LLP

(57) ABSTRACT

A cable includes: a cable main body; a first adhesive layer in contact with an outer peripheral surface of the cable main body; a protective member that covers an end part of the cable main body; an outer peripheral member that covers a part of the protective member; and a second adhesive layer on an inner peripheral surface of the outer peripheral member and in contact with the protective member. Adhesive strength of the second adhesive layer is larger than adhesive strength of the first adhesive layer.

8 Claims, 6 Drawing Sheets

(56) References Cited

FOREIGN PATENT DOCUMENTS

| | | |
|---|---|---|
| JP | 2010-044359 A | 2/2010 |
| JP | 2013-127555 A | 6/2013 |
| JP | 2016-186943 A | 10/2016 |
| JP | 2019092322 A | 6/2019 |
| JP | 2019160515 A | 9/2019 |

* cited by examiner

CABLE, CABLE MANUFACTURING METHOD, AND PROTECTIVE MEMBER REMOVAL METHOD

TECHNICAL FIELD

The present invention relates to a cable, a cable manufacturing method, and a protective member removal method.

Priority is claimed on Japanese Patent Application No. 2020-040735, filed Mar. 10, 2020, the content of which is incorporated herein by reference.

BACKGROUND

Patent Document 1 discloses an optical fiber cable.

PATENT LITERATURE

Patent Document 1

Japanese Unexamined Patent Application, First Publication No. 2013-127555

The cable may be provided with a protective member that protects the end part of a cable main body in order to facilitate a work of pulling the cable into a duct or the like of a building. While the protective member needs to be firmly fixed to the cable main body, when an adhesive having large adhesive strength is used, a large amount of adhesive residue may remain on the cable main body after the protective member is removed. When a large amount of adhesive residue remains, it takes a lot of time for cleaning work to remove the residue, which is a factor that reduces efficiency of cable installation work.

SUMMARY

One or more embodiments of the present invention provide a cable, a cable manufacturing method, and a protective member removal method capable of improving efficiency of the installation work.

According to one or more embodiments of the present invention, there is provided a cable comprising: a cable main body; a first adhesive layer in contact with an outer peripheral surface of the cable main body; a protective member that covers an end part of the cable main body; an outer peripheral member that covers a part of the protective member; and a second adhesive layer provided on an inner peripheral surface of the outer peripheral member and in contact with the protective member, in which adhesive strength of the second adhesive layer is larger than adhesive strength of the first adhesive layer.

According to the above embodiments, since the adhesive strength of the second adhesive layer fixing the protective member is large, the protective member is prevented from being separated from the cable main body even when the protective member is pulled when the cable is pulled into a duct or the like. Meanwhile, since the adhesive strength of the first adhesive layer in contact with the outer peripheral surface of the cable main body is small, a phenomenon that a residue of the first adhesive layer remains on the cable main body after the protective member is separated from the cable main body is unlikely to occur. Therefore, work of cleaning the residue of the first adhesive layer adhering to the cable main body can be omitted or simplified. From the above, it is possible to improve the efficiency of installation work.

Here, the cable according to the above embodiments may further comprise an interposed member disposed between the first adhesive layer and the second adhesive layer.

Further, the cable according to the above embodiments may further comprise a peeling auxiliary cord in contact with the first adhesive layer and spirally disposed radially outside the cable main body.

Further, the cable according to the above embodiments may further comprise a ripcord disposed radially outside the peeling auxiliary cord and radially inside the outer peripheral member and extending linearly along a longitudinal direction of the cable main body.

Further, a notch portion may be formed at an end part of the outer peripheral member in the longitudinal direction of the cable main body, and a part of the ripcord is disposed at a position overlapping the notch portion when viewed from an outside in a radial direction.

Further, a part of the peeling auxiliary cord may be disposed at a position overlapping the notch portion when viewed from the outside in the radial direction.

According to one or more embodiments of the present invention, there is provided a cable manufacturing method comprising: a step of covering at least a part of a cable main body in a longitudinal direction of the cable main body with an interposed member via a first adhesive layer; and a step of covering at least a part of the interposed member in the longitudinal direction with an outer peripheral member via a second adhesive layer having adhesive strength larger than adhesive strength of the first adhesive layer, and fixing a protective member covering an end part of the cable main body by the second adhesive layer.

According to the manufacturing method of the above embodiments, it is possible to manufacture a cable capable of improving the efficiency of the installation work.

According to one or more embodiments of the present invention, there is provided a protective member removal method of separating a protective member covering an end part of a cable main body from the cable main body, the method comprising: a ripping step of ripping an interposed member covering at least a part of the cable main body in a longitudinal direction of the cable main body via a first adhesive layer, and an outer peripheral member covering at least a part of the interposed member in the longitudinal direction via a second adhesive layer having adhesive strength larger than adhesive strength of the first adhesive layer, using a ripcord disposed linearly along the longitudinal direction; and a peeling step of peeling the interposed member from the cable main body using a peeling auxiliary cord in contact with the first adhesive layer and spirally disposed radially outside the cable main body, in which the protective member located between the interposed member and the outer peripheral member and fixed by the second adhesive layer is separated from the cable main body by performing the peeling step.

According to the protective member removal method of the above embodiments, it is possible to improve the efficiency in the installation work of the cable.

According to the above embodiments of the present invention, it is possible to improve efficiency in installation work of a cable.

DETAILED DESCRIPTION

First Embodiments

Hereinafter, a cable of first embodiments will be described with reference to the drawings.

Figure 1:
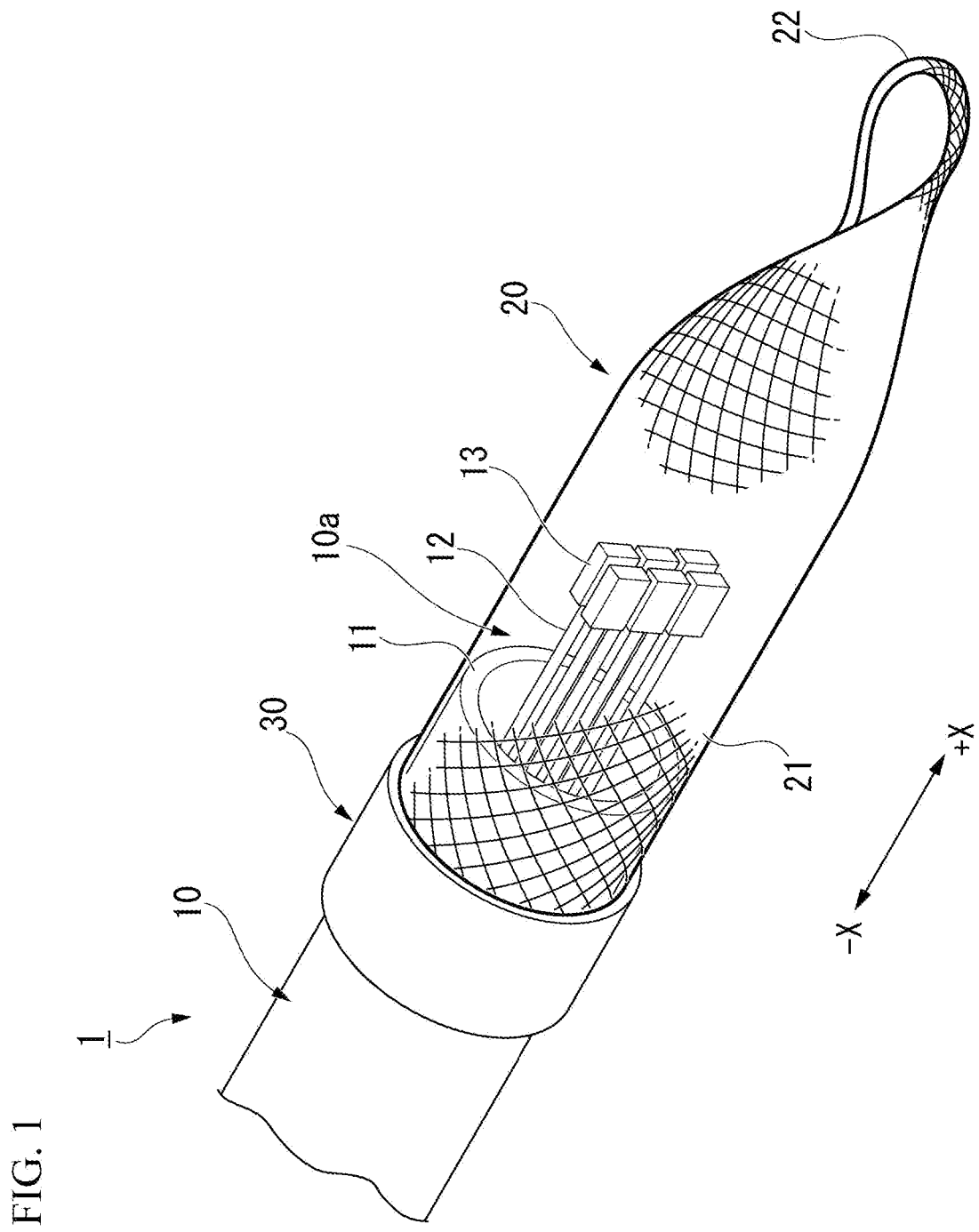
FIG. 1 is a perspective view of a cable according to first embodiments.

As shown in FIG. 1, a cable 1 includes a cable main body 10, a protective member 20, and an outer peripheral member 30. The cable main body 10 includes a sheath 11, a plurality of optical fibers 12 accommodated in the sheath 11, and a plurality of connectors 13 provided at end parts of the optical fibers 12. That is, the cable 1 of one or more embodiments is an optical fiber cable including the optical fibers 12 having the connectors 13. However, the connector 13 may not be provided at the end part of the optical fiber 12. Further, the sheath 11 may accommodate objects which are other linear members (for example, a power line or the like) instead of the optical fiber 12. That is, the cable 1 may be a power cable or the like.

Direction Definition

Figure 2:
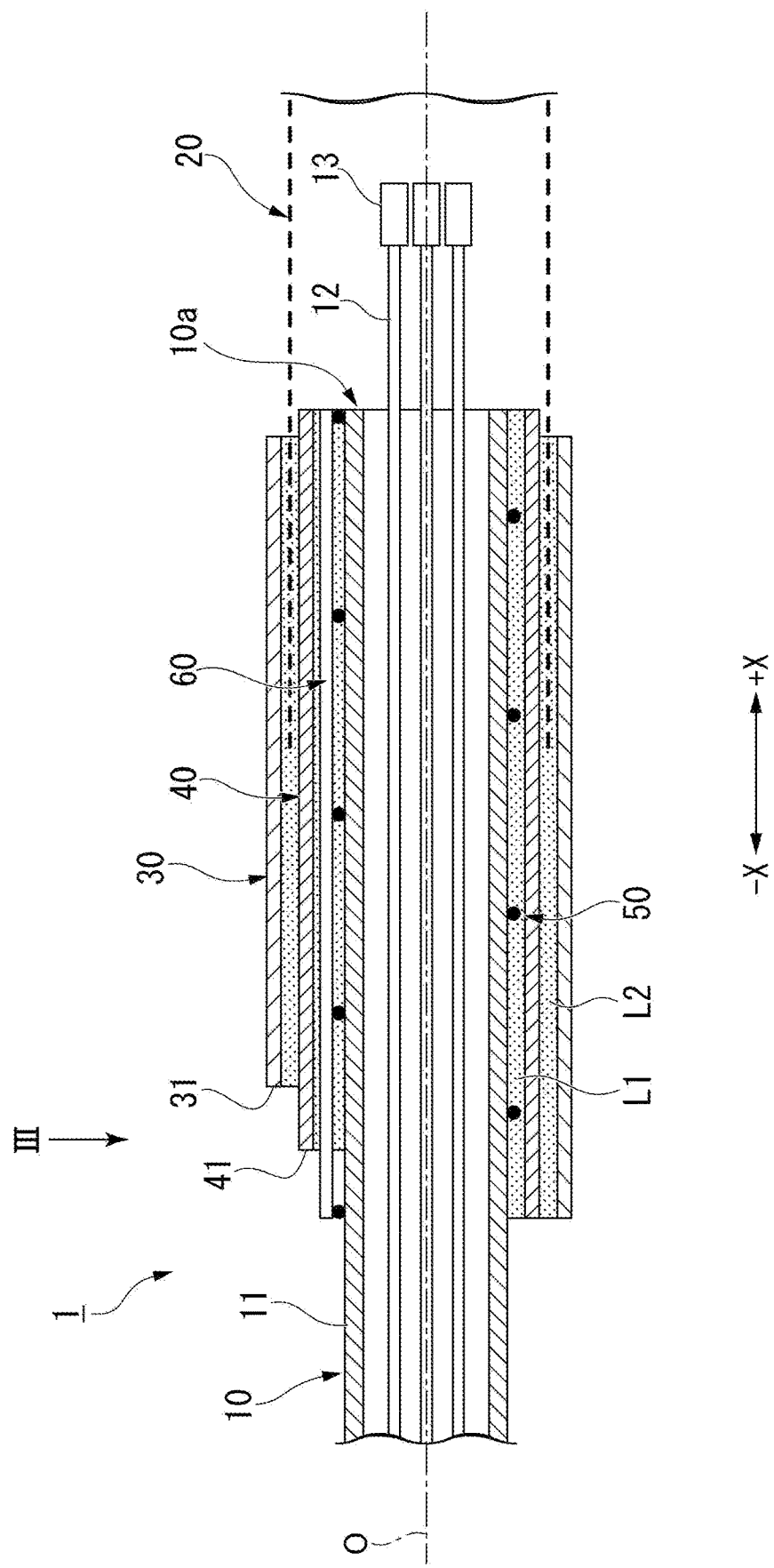
FIG. 2 is a cross-sectional view of the cable of FIG. 1.

In one or more embodiments, a longitudinal direction of the cable 1 is simply referred to as a longitudinal direction, and is represented by an X-axis in the drawings. One side (distal end side) in the longitudinal direction is referred to as a +X side, and the opposite side (proximal end side) is referred to as a −X side. Further, when viewed from the longitudinal direction, a direction that orbits around a central axis O (see FIG. 2) of the cable 1 is referred to as a circumferential direction, and a direction that intersects the central axis O is referred to as a radial direction. FIG. 2 is a cross-sectional view of the cable 1 along the central axis O.

As shown in FIG. 1, the connector 13 is disposed at an end part 10a of the cable main body 10. More specifically, each optical fiber 12 extends from an end part of the sheath 11 toward the +X side, and the connectors 13 are connected to the end part of each optical fiber 12. As the optical fiber 12, not only a single optical fiber but also a multi-optical fiber ribbon or the like can be used. Similarly, the connector 13 may be a single-fiber connector or a multi-fiber connector.

The protective member 20 has a tubular protective portion 21 and a ring-shaped pulling portion 22. The protective portion 21 covers the end part 10a of the cable main body 10 from the outside in the radial direction. The connector 13 is located inside the protective portion 21. The pulling portion 22 is located on the +X side of the protective portion 21. An end part of the protective portion 21 on the +X-side is closed by the pulling portion 22. Since the protective portion 21 covers the end part 10a, the end part 10a can be protected when the cable 1 is installed inside the building (duct or the like).

More specifically, it is possible to prevent the connector 13 being damaged by hitting a structure of the building, or the optical fiber 12 is exerted tension by the cable being snagged to the structure. Further, since the protective member 20 has the pulling portion 22, work (hereinafter referred to as pulling work) of pulling the cable 1 into the duct or the like becomes easy.

The pulling portion 22 does not necessarily have to be ring-shaped. For example, a knot formed by tying the end part of the tubular protective portion 21 on the +X-side is used as the pulling portion 22. Alternatively, another member may be used as the pulling portion 22 and fixed to the end part of the protective portion 21 on the +X-side.

As the protective member 20, for example, a braided tube can be used. The braided tube is a tube made by weaving fibers (generally resin fibers) into a mesh shape. Since the braided tube has high stretch property, the size of the protective portion 21 can be freely changed according to the size of the bundle of the connectors 13. Further, when the braided tube is used, a second adhesive layer L2, which will be described later, permeates the protective member 20, and thus, the protective member 20 can be fixed more firmly. Further, when a braided tube is used, the pulling portion 22 can be easily formed by making a knot by an extra length portion (portion located on the +X side of the connector 13) of the protective portion 21. However, the pulling portion 22 may be formed by binding the extra length portion of the protective member 20 with a binding member. Further, as the protective member 20, a tube (for example, a cloth bag or the like) other than the braided tube may be used.

As shown in FIG. 2, the cable 1 further includes an interposed member 40, a peeling auxiliary cord 50, a ripcord 60, a first adhesive layer L1, and the second adhesive layer L2. The interposed member 40, the peeling auxiliary cord 50, and the ripcord 60 may be omitted.

The first adhesive layer L1 is in contact with an outer peripheral surface (outer peripheral surface of the sheath 11) of the cable main body 10. In one or more embodiments, the first adhesive layer L1 is formed on an inner surface of the interposed member 40, and the interposed member 40 is wound around the cable main body 10. However, for example, the first adhesive layer L1 may be formed by applying an adhesive to the outer peripheral surface of the cable main body 10.

The interposed member 40 has a tubular shape and covers the cable main body 10 via the first adhesive layer L1. As the interposed member 40, a material that can be ripped by the ripcord 60 may be used. For example, the interposed member 40 may be a tape made of metal (aluminum or the like). However, when the interposed member 40 is incised with a cutter or the like without using the ripcord 60, the interposed member 40 may be made of a material that can be incised with a cutter or the like.

The first adhesive layer L1 is disposed between the cable main body 10 and the interposed member 40. The first adhesive layer L1 is in contact with both the outer peripheral surface (the outer peripheral surface of the sheath 11) of the cable main body 10 and the inner peripheral surface of the interposed member 40. At the time of manufacture, the first adhesive layer L1 may be held on a surface of a tape material to be the interposed member 40, or may be held on the outer peripheral surface of the cable main body 10. The material of the first adhesive layer L1 will be described later.

The peeling auxiliary cord 50 is spirally disposed radially outside the cable main body 10 along the longitudinal direction. The peeling auxiliary cord 50 is in contact with the first adhesive layer L1 and is located radially inside the ripcord 60, the interposed member 40, and the outer peripheral member 30. The peeling auxiliary cord 50 may be in contact with the cable main body 10. Alternatively, the peeling auxiliary cord 50 may not be in contact with the cable main body 10 by interposing the first adhesive layer L1.

The ripcord 60 extends linearly along the longitudinal direction. The ripcord 60 is located radially outside the peeling auxiliary cord 50 and radially inside the interposed member 40 and the outer peripheral member 30. In one or more embodiments, the cable 1 includes one ripcord 60. However, the cable 1 may include two ripcords 60, and in this case, the two ripcords 60 may be disposed so as to sandwich the cable main body 10 in the radial direction.

Since the ripcord 60 is used for ripping the interposed member 40 and the outer peripheral member 30, it has a strength capable of ripping such members. The peeling auxiliary cord 50 is used to peel the interposed member 40 and the outer peripheral member 30 from the cable main body 10 after the ripcord 60 has ripped the interposed member 40 and the outer peripheral member 30. As the material of the ripcord 60 and the peeling auxiliary cord 50, for example, synthetic fibers such as polyester and aramid can be adopted. The materials of the ripcord 60 and the peeling auxiliary cord 50 may be the same or different.

The outer peripheral member 30 has a tubular shape and covers the cable main body 10, the interposed member 40, and the protective member 20 from the outside in the radial direction. The second adhesive layer L2 is provided on the inner peripheral surface of the outer peripheral member 30. The outer peripheral member 30 holds the second adhesive layer L2 so as to have a role of fixing the protective member 20 by the adhesive strength of the second adhesive layer L2. As the outer peripheral member 30, a heat-shrinkable tube can be used.

The second adhesive layer L2 is disposed between the outer peripheral member 30 and the interposed member 40. The second adhesive layer L2 is in contact with both the inner peripheral surface of the outer peripheral member 30 and the outer peripheral surface of the interposed member 40. At the time of manufacture, the second adhesive layer L2 may be held on the inner peripheral surface of the heat-shrinkable tube serving as the outer peripheral member 30, or may be held on the surface of the tape material serving as the interposed member 40.

Figure 3:
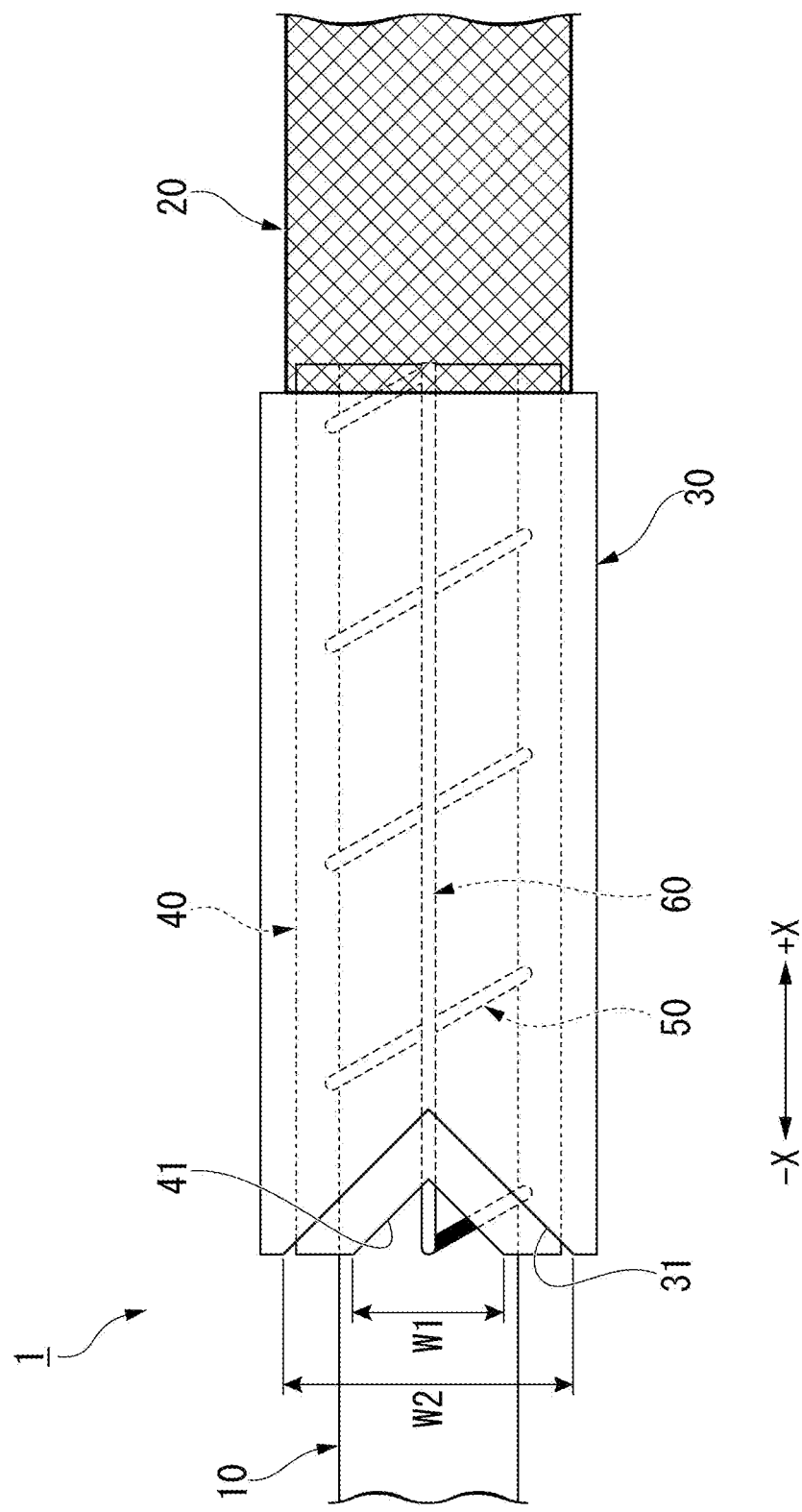
FIG. 3 is a view in a direction of an arrow III in FIG. 2.

As shown in FIG. 3, a notch portion 31 (outer notch portion) is formed in the outer peripheral member 30, and a notch portion 41 (inner notch portion) is formed in the interposed member 40. The notch portions 31 and 41 are formed at the end parts of the outer peripheral member 30 and the interposed member 40 on the −X-side. When viewed from the outside in the radial direction as shown in FIG. 3, a width W1 of the notch portion 41 in a direction orthogonal to the longitudinal direction becomes smaller toward the +X side. Similarly, a width W2 of the notch portion 31 becomes smaller toward the +X side. The notch portions 31 and 41 are disposed so that at least a part of the notch portions 31 and 41 overlap each other when viewed from the outside in the radial direction. Further, when viewed from the outside in the radial direction, the −X-side end parts of the cords 50 and 60 are disposed so as to overlap the notch portions 31 and 41. Therefore, a part of each of the cords 50 and 60 can be visually recognized through the notch portions 31 and 41.

The notch portions 31 and 41 are provided to facilitate the operation of ripping the interposed member 40 and the outer peripheral member 30 by the ripcord 60. Therefore, in the case where the interposed member 40 and the outer peripheral member 30 can be ripped by the ripcord 60 even when the notch portions 31 and 41 are not provided, or in a case where the ripcord 60 is not provided, the notch portions 31 and 41 may not be provided. Alternatively, only one of the notch portions 31 or 41 may be formed.

Here, in one or more embodiments, the adhesive strength of the second adhesive layer L2 is larger than the adhesive strength of the first adhesive layer L1. As used herein, the term "adhesive strength" means a force required to peel off the adhesive layers L1, L2 in a direction perpendicular to the bonded surface. The adhesive strength of the adhesive layers L1, L2 is determined by the radial thicknesses and materials of the adhesive layers L1, L2. When the thicknesses of the adhesive layers L1, L2 are such that they are usually used in the field of adhesives (the thickness is not excessive), the larger the thickness, the larger the adhesive strength. Therefore, in order to set the adhesive strength of the second adhesive layer L2 to be larger than the adhesive strength of the first adhesive layer L1, for example, any of the following conditions (1) to (3) may be used.

(1) The thicknesses of the adhesive layers L1 and L2 are the same, and adhesiveness of the material of the second adhesive layer L2 is higher than that of the material of the first adhesive layer L1.

(2) The materials of the adhesive layers L1 and L2 are the same, and the thickness of the second adhesive layer L2 is larger than that of the first adhesive layer L1.

(3) The thickness of the second adhesive layer L2 is larger than that of the first adhesive layer L1, and the adhesiveness of the material of the second adhesive layer L2 is higher than that of the material of the first adhesive layer L1.

However, as long as the adhesive strength of the second adhesive layer L2 can be made larger than that of the first adhesive layer L1, the following conditions (4) or (5) may be used.

(4) The thickness of the second adhesive layer L2 is smaller than that of the first adhesive layer L1, but the adhesiveness of the material of the second adhesive layer L2 is higher than that of the first adhesive layer L1.

(5) The adhesiveness of the material of the second adhesive layer L2 is lower than that of the first adhesive layer L1, but the thickness of the second adhesive layer L2 is larger than that of the first adhesive layer L1.

Specific examples of the combination of materials of the adhesive constituting the adhesive layers L1 and L2 include the following.

First Adhesive Layer L1: Acrylic Adhesive

Second adhesive layer L2: Thermoplastic adhesive

As confirmed by the above combination, the adhesiveness of the material (acrylic adhesive) of the second adhesive layer L2 was about 2.5 times the adhesiveness of the first adhesive layer L1 (thermoplastic adhesive). Therefore, the above-mentioned conditions (1), (3), and (4) can be applied.

The adhesive layers L1 and L2 may be composed of only an adhesive. Alternatively, like a general double-sided tape or the like, each of the adhesive layers L1 and L2 may include a base material layer and adhesive layers provided on the front and back surfaces of the base material layer.

Next, an example of a method for manufacturing the cable 1 will be described. The following manufacturing method is just an example, and other manufacturing methods may be adopted.

First, the cable main body 10, the braided tube serving the protective member 20, the tape serving as the interposed member 40, the heat-shrinkable tube serving as the outer peripheral member 30, the peeling auxiliary cord 50, and the ripcord 60 are prepared. The adhesive serving as the first adhesive layer L1 is previously provided on one surface of the tape serving as the interposed member 40. Further, the adhesive serving as the second adhesive layer L2 is previously provided on an inner peripheral surface of the heat-shrinkable tube serving as the outer peripheral member 30.

As the heat-shrinkable tube, a tube of which an inner diameter is larger than the outer diameter of the interposed member 40 to some extent (for example, several mm) in the state before shrinkage is selected.

Next, the peeling auxiliary cord 50 is spirally wound around the cable main body 10.

Next, the ripcord 60 is linearly disposed on the peeling auxiliary cord 50.

Next, with the side provided with the adhesive inside, the tape serving as the interposed member 40 is wound around the cable main body 10 from above the ripcord 60 and the peeling auxiliary cord 50. At this time, the tape serving as the interposed member 40 may be pressed against the cable main body 10 so that the first adhesive layer L1 is in contact with the ripcord 60, the peeling auxiliary cord 50, and the outer peripheral surface of the cable main body 10. As a result, the ripcord 60 and the peeling auxiliary cord 50 are securely fixed to the cable main body 10 by the first adhesive layer L1.

Next, the end part 10a of the cable main body 10 is covered together with the connector 13 by the braided tube serving as the protective member 20. If necessary, the end part of the braided tube on the +X-side may be processed in advance to form the pulling portion 22.

Next, the heat-shrinkable tube serving as the outer peripheral member 30 covers at least a part of the interposed member 40 in the longitudinal direction. At this time, a part of the protective member 20 is also covered with the outer peripheral member 30 at the same time.

Next, the heat-shrinkable tube is heated and shrunk. As a result, the protective member 20 is tightened between the outer peripheral member 30 and the interposed member 40, and the protective member 20 is fixed by the second adhesive layer L2 provided on the inner peripheral surface of the outer peripheral member 30. At this time, when the second adhesive layer L2 is a thermoplastic adhesive, the second adhesive layer L2 is also heated to generate fluidity. As a result, the second adhesive layer L2 permeates the protective member 20, and fixing strength of the protective member 20 can be further increased. However, it is possible to fix the protective member 20 even when the second adhesive layer L2 does not penetrate the protective member 20.

Next, if necessary, the second adhesive layer L2 is cured. For example, when the second adhesive layer L2 is a thermoplastic adhesive, the outer peripheral member 30 and the second adhesive layer L2 are cooled and cured. As a cooling method, it may be simply left to cool naturally.

The cable 1 can be manufactured by the above steps.

Next, an operation of the cable 1 configured as described above will be described.

After the pulling work of the cable 1 is completed, the protective member 20 that protects the end part 10a of the cable main body 10 becomes unnecessary. Further, it is necessary to remove the protective member 20 in order to perform the connection work of the connector 13.

When removing the protective member 20, the −X-side end part of the ripcord 60 is pinched with a finger or a tool (pliers or the like), lifted outward in the radial direction, and pulled toward the +X side. As a result, as shown in FIG. 4, the interposed member 40 and the outer peripheral member 30 are ripped along the longitudinal direction (ripping step).

In the ripping step, the ripcord 60 is in contact with the first adhesive layer L1 to prevent the ripcord 60 from being unexpectedly pulled out from between the interposed member 40 and the cable main body 10. Therefore, the force for ripping is more reliably transmitted from the ripcord 60 to the interposed member 40 and the outer peripheral member 30, and the ripping work can be facilitated. Further, stress is concentrated on the +X-side of the end parts of the notch portions 31 and 41, and breakage is likely to occur starting from these end parts. Therefore, the notch portions 31 and 41 make the ripping work easier.

Figure 4:
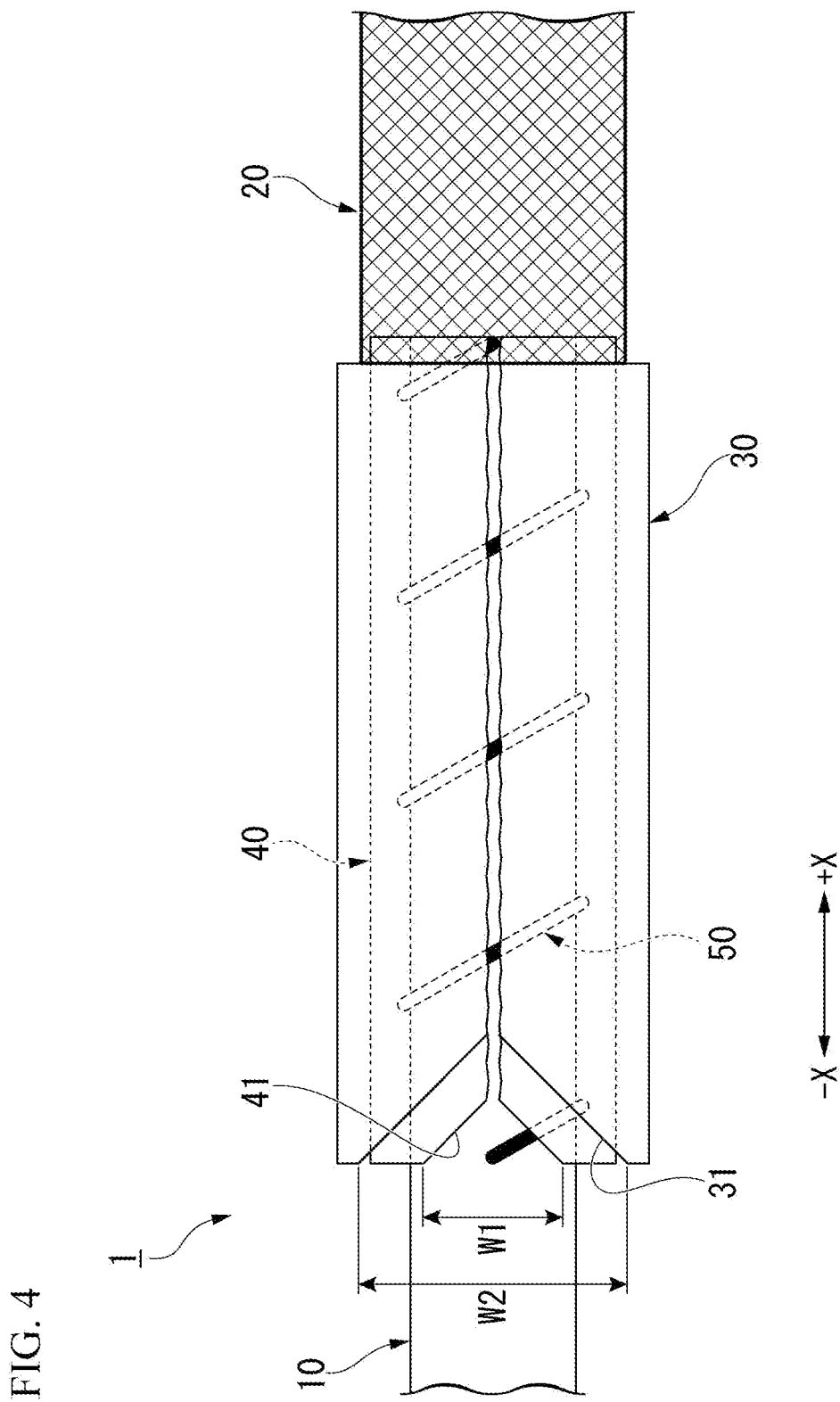
FIG. 4 is a view after ripping an outer peripheral member or the like using a ripcord of FIG. 3.

As shown in FIG. 4, after ripping the interposed member 40 and the outer peripheral member 30, the −X-side end part of the peeling auxiliary cord 50 is pinched with a finger or a tool (pliers, or the like) and lifted outward in the radial direction to assist in unwinding the peeling auxiliary cord 50 from the cable main body 10. At this time, since the interposed member 40 receives a force from the peeling auxiliary cord 50 toward the outside in the radial direction, the interposed member 40 bonded by the first adhesive layer L1 can be easily peeled from the cable main body 10 by this force (peeling step). By peeling the interposed member 40 from the cable main body 10, the protective member 20 located between the interposed member 40 and the outer peripheral member 30 is also naturally separated from the cable main body 10.

Here, the adhesive strength of the first adhesive layer L1 is smaller than the adhesive strength of the second adhesive layer L2, and the residue of the first adhesive layer L1 is unlikely to remain on the cable main body 10. Therefore, the work of cleaning the residue of the first adhesive layer L1 adhering to the cable main body 10 can be omitted or simplified. Meanwhile, since the adhesive strength of the second adhesive layer L2 fixing the protective member 20 is large, even when the pulling portion 22 is pulled when the cable 1 is pulled into the duct or the like, the protective member 20 is prevented from being separated from the cable main body 10.

When the pulling portion 22 is pulled, a force that tends to peel the first adhesive layer L1 in the horizontal direction also acts on the adhesive surface. However, the force in the horizontal direction can be received by the entire adhesive surface of the first adhesive layer L1, and it is difficult for the force to concentrate on a specific part. Therefore, even when the adhesive strength of the first adhesive layer L1 is smaller than the adhesive strength of the second adhesive layer L2, it is possible to prevent the first adhesive layer L1 from being peeled off during the pulling work.

As described above, the cable 1 of one or more embodiments includes the cable main body 10, the first adhesive layer L1 in contact with the outer peripheral surface of the cable main body 10, the protective member 20 that covers the end part 10a of the cable main body 10, the outer peripheral member 30 that covers a part of the protective member 20, and the second adhesive layer L2 provided on the inner peripheral surface of the outer peripheral member 30 and in contact with the protective member 20, in which the adhesive strength of the second adhesive layer L2 is larger than the adhesive strength of the first adhesive layer L1. According to this configuration, since the adhesive strength of the second adhesive layer L2 fixing the protective member 20 is large, even when the protective member 20 is pulled when the cable 1 is pulled into a duct or the like, the protective member 20 is prevented from being separated from the cable main body 10. Meanwhile, since the adhesive strength of the first adhesive layer L1 in contact with the outer peripheral surface of the cable main body 10 is small, a phenomenon that the residue of the first adhesive layer L1 remains on the cable main body 10 after the protective member 20 is separated from the cable main body 10 is unlikely to occur. Therefore, the work of cleaning the residue of the first adhesive layer L1 adhering to the cable main body 10 can be omitted or simplified. From the above, it is possible to improve the efficiency of the installation work.

Further, the cable 1 further includes the interposed member 40 disposed between the first adhesive layer L1 and the second adhesive layer L2. As a result, it is possible to prevent the first adhesive layer L1 and the second adhesive layer L2 from being mixed with each other. Further, at the time of manufacturing the cable 1, the first adhesive layer L1 can be held on the inner peripheral surface of the interposed member 40. Therefore, the manufacturing of the cable 1 becomes easier.

Also, the cable 1 further includes the peeling auxiliary cord 50 in contact with the first adhesive layer L1 and spirally disposed radially outside the cable main body 10. This facilitates the work of peeling the interposed member 40 from the cable main body 10 against the adhesive strength of the first adhesive layer L1, after ripping the outer peripheral member 30 and the interposed member 40. Therefore, it is possible to improve the efficiency of the installation work.

And, the cable 1 further includes the ripcord 60 disposed radially outside the peeling auxiliary cord 50 and radially inside the interposed member 40 and the outer peripheral member 30, and extending linearly along the longitudinal direction. Since the outer peripheral member 30 and the interposed member 40 can be ripped by the ripcord 60, it is possible to save the trouble of incising the outer peripheral member 30 and the interposed member 40 with a blade such as a cutter. Further, it is possible to prevent an object (the optical fiber 12 in one or more embodiments) to be accommodated in the cable main body 10 from being damaged by the blade. Therefore, it is possible to improve the efficiency of the installation work.

Further, the notch portions 31 and 41 are each formed at the end parts of the outer peripheral member 30 and the interposed member 40 in the longitudinal direction, and a part of the ripcord 60 is disposed at a position overlapping the notch portions 31 and 41 when viewed from the outside in the radial direction. According to this configuration, when the outer peripheral member 30 and the interposed member 40 are ripped by the ripcord 60, the notch portions 31 and 41 are the starting points and breakage is likely to occur. Therefore, the ripping step can be made more efficient.

Further, a part of the peeling auxiliary cord 50 is disposed at a position overlapping the notch portions 31 and 41 when viewed from the outside in the radial direction. Therefore, after the ripping step, when the interposed member 40 is peeled from the cable main body 10 against the adhesive strength of the first adhesive layer L1, a peeling force can be applied to the peripheral parts of the notch portions 31 and 41 by the peeling auxiliary cord 50. Since the peripheral parts of the notch portions 31 and 41 have already been broken by the ripcord 60, peeling is likely to occur. Therefore, the interposed member 40 can be easily peeled off from the peripheral part of the notch portions 31 and 41, and the peeling step can be made more efficient.

Further, the manufacturing method of the cable 1 of one or more embodiments includes a step of covering at least a part of the cable main body 10 in the longitudinal direction with the interposed member 40 via the first adhesive layer L1 and a step of covering at least a part of the interposed member 40 in the longitudinal direction with the outer peripheral member 30 via the second adhesive layer L2 having adhesive strength larger than adhesive strength of the first adhesive layer L1, and fixing the protective member 20 covering the end part 10a of the cable main body 10 by the second adhesive layer L2. By the manufacturing method, it is possible to manufacture the cable 1 capable of improving the efficiency of the installation work.

Further, the protective member removal method of one or more embodiments is a protective member removal method of separating the protective member 20 covering the end part 10a of the cable main body 10 from the cable main body 10, and includes the ripping step and the peeling step. In the ripping step, the interposed member 40 covering at least a part of the cable main body 10 via the first adhesive layer L1 and the outer peripheral member 30 covering at least a part of the interposed member 40 via the second adhesive layer L2 are ripped using the ripcord 60 disposed linearly along the longitudinal direction. In the peeling step, the interposed member 40 is peeled from the cable main body 10 using the peeling auxiliary cord 50 which is in contact with the first adhesive layer L1 and is spirally disposed radially outside the cable main body 10. Then, the protective member 20 located between the interposed member 40 and the outer peripheral member 30 and fixed by the second adhesive layer L2 is separated from the cable main body 10 by performing the peeling step. By adopting the protective member removal method, it is possible to improve the efficiency in the installation work of the cable 1.

Second Embodiments

Next, second embodiments according to the present invention will be described, but a basic configuration thereof is the same as that of the first embodiments. Therefore, the same reference numerals are given to the same configurations, the description thereof will be omitted, and only the different points will be described.

A cable 1 of one or more embodiments is different from the first embodiments in that it does not include an interposed member 40.

Figure 5:
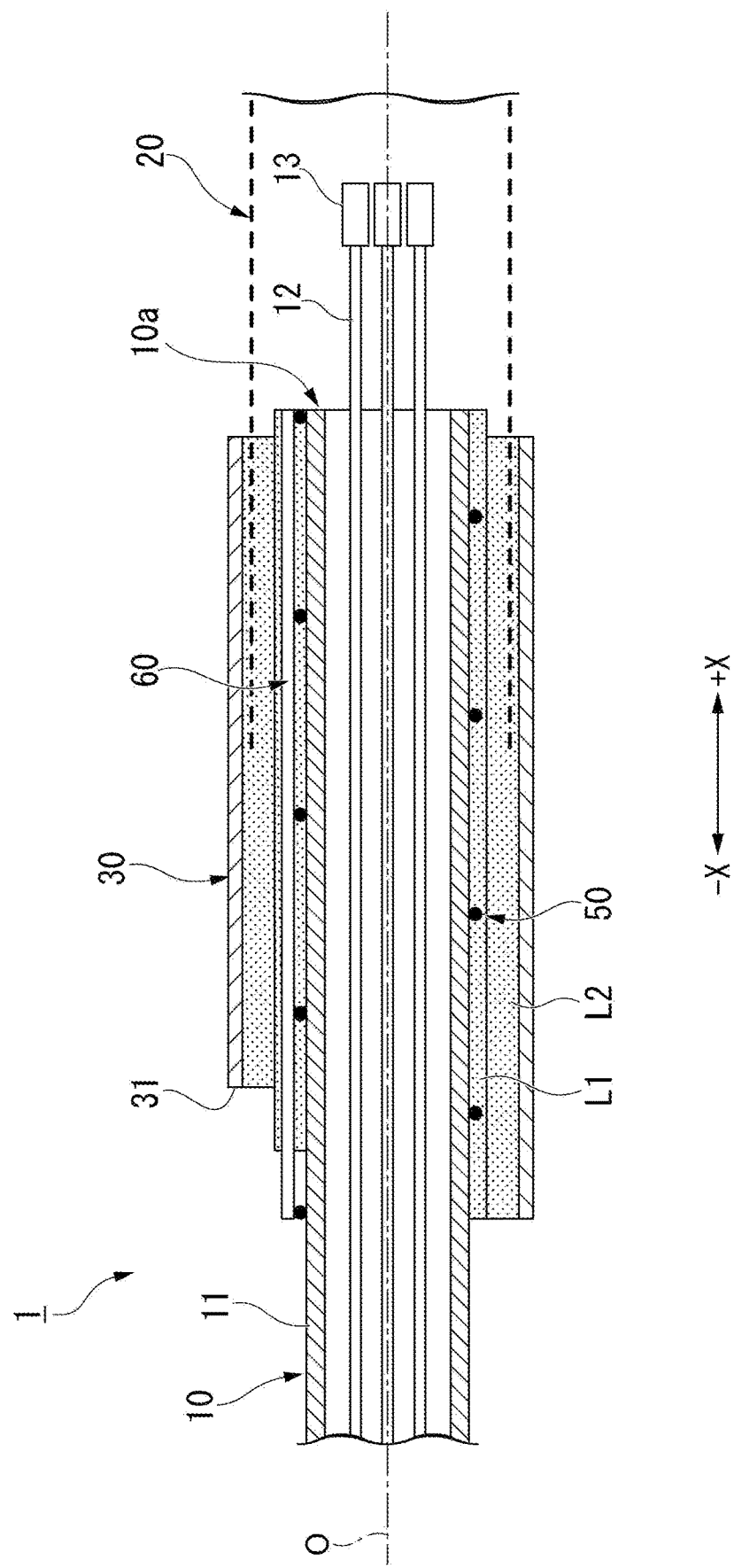
FIG. 5 is a cross-sectional view of a cable according to second embodiments.

As shown in FIG. 5, in one or more embodiments, a first adhesive layer L1 and a second adhesive layer L2 are in contact with each other. A protective member 20 may be located inside the second adhesive layer L2 and may not be in contact with the first adhesive layer L1. Alternatively, the protective member 20 may be sandwiched between the second adhesive layer L2 and the first adhesive layer L1 and in contact with both.

When manufacturing the cable 1 of one or more embodiments, the first adhesive layer L1 may be provided in advance on the cable main body 10, and a peeling auxiliary cord 50, a ripcord 60, and the like may be disposed on the first adhesive layer L1. Alternatively, after arranging the peeling auxiliary cord 50 and the ripcord 60, the first adhesive layer L1 may be provided from above. As a method of providing the first adhesive layer L1, an adhesive may be applied to the cable main body 10, or a double-sided tape may be wrapped around the cable main body 10. Other points are the same as the manufacturing method described in the first embodiments.

Similar to the first embodiments, the cable 1 of one or more embodiments includes the cable main body 10, the first adhesive layer L1 in contact with the outer peripheral surface of the cable main body 10, the protective member 20 that covers the end part 10a of the cable main body 10, the outer peripheral member 30 that covers a part of the protective member 20, and the second adhesive layer L2 provided on the inner peripheral surface of the outer peripheral member 30 and in contact with the protective member 20, in which the adhesive strength of the second adhesive layer L2 is larger than the adhesive strength of the first adhesive layer L1. Therefore, the same effect as that of the first embodiments can be obtained.

Also, the cable 1 of one or more embodiments further includes the peeling auxiliary cord 50 which is in contact with the first adhesive layer L1 and is spirally disposed radially outside the cable main body 10. This facilitates the work of peeling the outer peripheral member 30 from the cable main body 10 against the adhesive strength of the first adhesive layer L1, after ripping the outer peripheral member 30. Therefore, it is possible to improve the efficiency of the installation work.

Further, the cable 1 of one or more embodiments further includes the ripcord 60 which is disposed radially outside the peeling auxiliary cord 50 and radially inside the outer peripheral member 30 and extends linearly along the longitudinal direction. Since the outer peripheral member 30 can be ripped by the ripcord 60, it is possible to save the trouble of incising the outer peripheral member 30 with a blade such as a cutter. Further, it is possible to prevent an object (the optical fiber 12 in one or more embodiments) to be accommodated in the cable main body 10 from being damaged by the blade. Therefore, it is possible to improve the efficiency of the installation work.

Further, the notch portion 31 is formed at the end part of the outer peripheral member 30 in the longitudinal direction, and a part of the ripcord 60 is disposed at a position overlapping the notch portion 31 when viewed from the outside in the radial direction. According to this configuration, when the outer peripheral member 30 is ripped by the ripcord 60, the notch portion 31 is the starting point and breakage is likely to occur. Therefore, the ripping step can be made more efficient.

Further, a part of the peeling auxiliary cord 50 is disposed at a position overlapping the notch portion 31 when viewed from the outside in the radial direction. Therefore, after the ripping step, when the outer peripheral member 30 is peeled from the cable main body 10 against the adhesive strength of the first adhesive layer L1, a peeling force can be applied to the peripheral part of the notch portion 31 by the peeling auxiliary cord 50. Since the peripheral part of the notch portion 31 has already been broken by the ripcord 60, peeling is likely to occur. Therefore, the outer peripheral member 30 can be easily peeled off from the peripheral part of the notch portion 31, and the peeling step can be made more efficient.

A technical scope of the present invention is not limited to the above-described embodiments, and various modifications can be made without departing from a spirit of the present invention.

Figure 6:
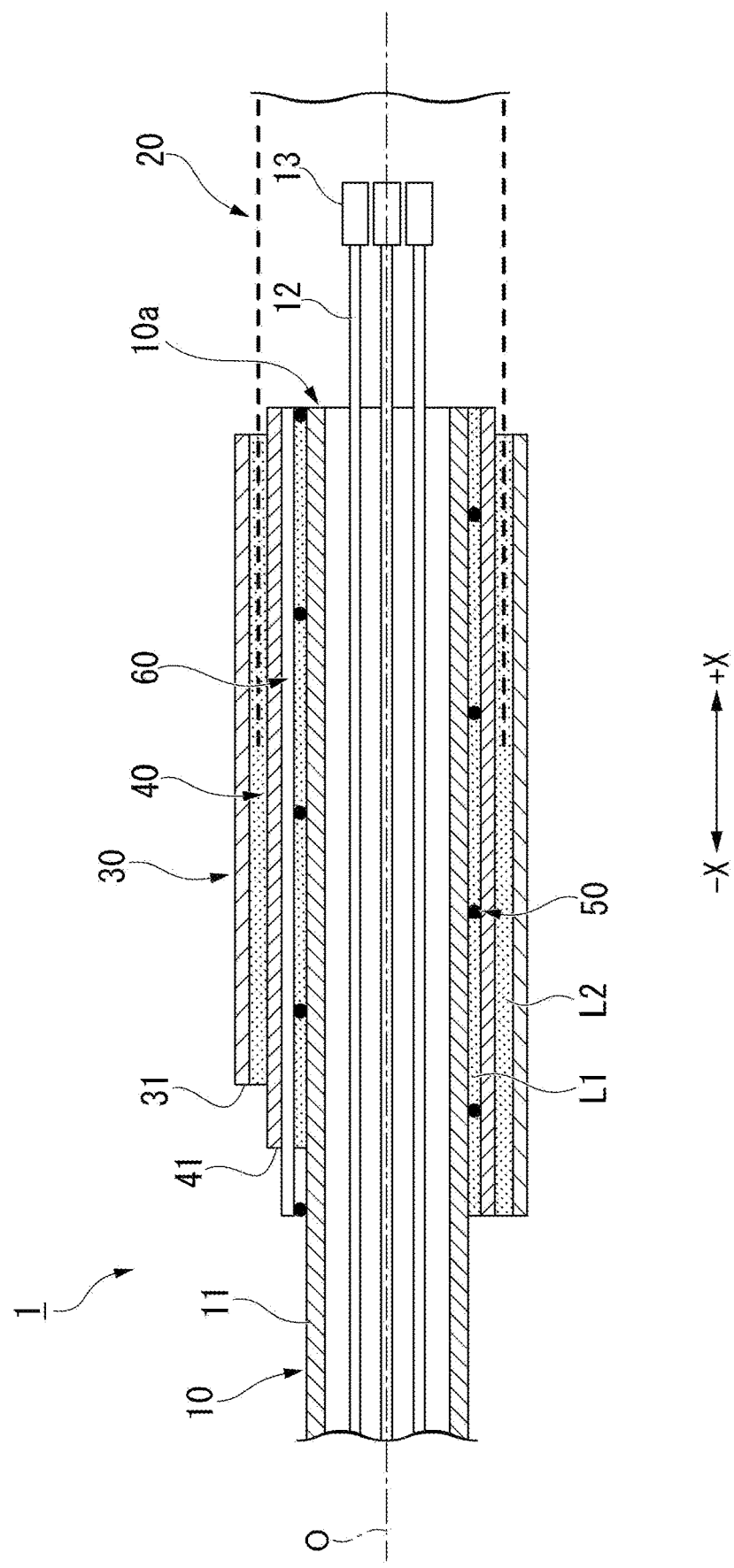
FIG. 6 is a cross-sectional view of a cable according to a modification example of the first embodiments.

For example, in the cable 1 of the first embodiments, as shown in FIG. 6, a part of the interposed member 40 may be in direct contact with the peeling auxiliary cord 50 without going through the first adhesive layer L1 or the like. When the interposed member 40 comes into contact with the peeling auxiliary cord 50, a contact area between the two increases, and the interposed member 40 can be made stronger against the tensile force in the longitudinal direction.

In addition, it is possible to replace the components in the above-described embodiments with well-known components as appropriate without departing from the spirit of the present invention, and the above-described embodiments and modification examples may be appropriately combined.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST

1: Cable
10: Cable main body
10a: End part of cable main body
20: Protective member
30: Outer peripheral member
31: Notch portion
40: Interposed member
50: Peeling auxiliary cord
60: Ripcord
L1: First adhesive layer
L2: Second adhesive layer

What is claimed is:

1. A cable comprising:
a cable main body;
a first adhesive layer in contact with an outer peripheral surface of the cable main body;
a protective member that covers an end part of the cable main body;
an outer peripheral member that covers a part of the protective member; and
a second adhesive layer on an inner peripheral surface of the outer peripheral member and in contact with the protective member, wherein
adhesive strength of the second adhesive layer is larger than adhesive strength of the first adhesive layer.

2. The cable according to claim 1, further comprising an interposed member between the first adhesive layer and the second adhesive layer.

3. The cable according to claim 1, further comprising a peeling auxiliary cord in contact with the first adhesive layer and spirally disposed radially outside the cable main body.

4. The cable according to claim 3, further comprising a ripcord disposed radially outside the peeling auxiliary cord and radially inside the outer peripheral member and extending linearly along a longitudinal direction of the cable main body.

5. The cable according to claim 4, wherein
a notch portion is disposed at an end part of the outer peripheral member in the longitudinal direction of the cable main body, and
a part of the ripcord is disposed at a position overlapping the notch portion when viewed from an outside in a radial direction of the cable main body.

6. The cable according to claim 5, wherein a part of the peeling auxiliary cord is disposed at a position overlapping the notch portion when viewed from the outside in the radial direction.

7. A cable manufacturing method comprising:
covering at least a part of a cable main body in a longitudinal direction of the cable main body with an interposed member via a first adhesive layer; and
covering at least a part of the interposed member in the longitudinal direction with an outer peripheral member via a second adhesive layer:
having adhesive strength larger than adhesive strength of the first adhesive layer, and
fixing a protective member covering an end part of the cable main body by the second adhesive layer.

8. A protective member removal method of separating a protective member covering an end part of a cable main body from the cable main body, the protective member removal method comprising:
ripping:
  an interposed member covering at least a part of the cable main body in a longitudinal direction of the cable main body via a first adhesive layer, and
  an outer peripheral member covering at least a part of the interposed member in the longitudinal direction via a second adhesive layer having adhesive strength larger than adhesive strength of the first adhesive layer,
  using a ripcord disposed linearly along the longitudinal direction; and
peeling the interposed member from the cable main body using a peeling auxiliary cord in contact with the first adhesive layer and spirally disposed radially outside the cable main body, wherein
the protective member is disposed between the interposed member and the outer peripheral member and fixed by the second adhesive layer, and
the peeling comprises separating the protective member from the cable main body.

* * * * *